United States Patent Office 2,964,565
Patented Dec. 13, 1960

2,964,565

METHOD OF SEPARATING OCTAHALOCYCLO-HEXENE-3-ONE-1 FROM MIXTURES CONTAINING SAID COMPOUND AND OCTAHALOCYCLOHEXENE-2-ONE-1

Charles J. Pennino, Avon Lake, Ohio, assignor to The B. F. Goodrich Company, Akron, Ohio, a corporation of New York No Drawing. Original application Feb. 1, 1955, Ser. No. 485,589, now Patent No. 2,843,606, dated July 15, 1958. Divided and this application Apr. 14, 1958, Ser. No. 728,031

3 Claims. (Cl. 260—586)

This invention relates to a method for preparing halogenated maleic acid, salts and anhydrides thereof from octahalocyclohexene-3-one-1 and more particularly relates to a method for preparing dihalomaleic acid, salts and anhydrides thereof by scission of octahalocyclohexene-3-one-1 in the presence of a strong alkali.

Dichloro-dibromo- and chlorobromomaleic acids and anhydrides are useful for preparing copolymers with vinyl alkyl ethers such as methyl vinyl ether. The imides of the dihalomaleic acids mentioned above are useful as insecticides and herbicides.

An object of this invention is the provision of a method for preparing dihalomaleic acids, anhydrides and salts thereof from octahalocyclohexene-3-one-1. Another object is the provision of a method for the preparation of dichloromaleic acid, salts and anhydrides thereof by scission of octachlorocyclohexene-3-one-1 in the presence of a strong alkali. Another object is the provision of a method for preparing dibromomaleic acid, salts and anhydrides thereof by scission of octabromocyclohexene-3-one-1 in the presence of a strong alkali. Still another object is the provision of a method for preparing chlorobromomaleic acid, salts and anhydrides thereof by scission of an octahalocyclohexene-3-one-1 which has both chlorine and bromine atoms on adjacent carbon atoms of the cyclohexene ring, preferably in either the 3 or 4 position. Numerous other objects will be apparent from the following description which discloses a preferred embodiment of the invention.

These objects are accomplished by splitting an octahalocyclohexene-3-one-1 ring with a strong alkaline material. Included among the strong alkalies which are useful for effecting this scission are lithium, sodium, potassium and cesium hydroxides, oxides, carbonates and bicarbonates. In addition, the alkaline earth metal hydroxides are sufficiently alkaline to cause a rupture of the ring and yield dihalomaleic acids, salts and anhydrides.

The octahalocyclohexene-3-one-1 can be prepared by exhaustive chlorination or bromination of phenols or partially halogenated phenols preferably in the presence of a chlorination catalyst such as ferric chloride or $SbCl_3$ and in the presence of actinic light. This exhaustive halogenation of phenol yields a mixture of octahalocyclohexene-3-one-1 and octahalocyclohexene-2-one-1. In order to prepare the dihalomaleic acids, salts or anhydrides thereof it is not necessary to purify the octahalocyclohexenones at this stage, since each of these cyclic halogenated ketones yields a different end product upon alkaline scission of the cyclohexene ring and therefore separation can be made after treatment with a strong alkali. Alternatively, it is possible to separate the two octahalocyclohexenone compounds and treat only the octahalocyclohexene-3-one-1 with the alkaline material to form the maleic compounds directly. Because of the alkalinity of the reacting medium salts of dihalomaleic acid are usually formed with inorganic alkaline compounds. The dihalomaleic salts can be readily converted to the acids by acidification and thereafter heating above the melting point to convert the acid to the anhydride.

The octahalocyclohexene-3-one-1 compounds that can be reacted with strong alkaline materials to form the dihalomaleic acids include 2,2,3,4,5,5,6,6-octachlorocyclohexene-3-one-1, 2,2,3,4,5,5,6,6-octabromocyclohexene - 3 - one - 1, 2,2,4,5,5,6,6 - heptachloro - 3 - bromo-octahalocyclohexene - 3 - one - 1, 2,2,3,5,5,6,6 - heptachloro-4-bromocyclohexene-3-one-1. It is evident that other octahalocyclohexene-3-one-1 compounds can also be employed, for example, the octahalocyclohexene-3-one-1 which results from halogenation of phenol or a partially halogenated phenol by a mixture of chlorine and bromine can be used. Also a compound such as 2,4,6-trichloro phenol can be brominated to form 2,3,5,5,6-pentabromo - 2,4,6 - trichloro - cyclohexene - 3 - one-1 or 2,4,6-tribromo phenol can be chlorinated to yield 2,3,5, 5,6-pentachloro-2,4,6-tribromo cyclohexene-3-one-1. In the latter two cases the maleic acid or its derivative that results from the scission of the cyclohexene ring by alkali will contain both chlorine and bromine in its final structure.

A strong alkaline material is essential for splitting the octahalocyclohexene-3-one-1 molecule. The reaction will proceed very slowly at room temperature or below, but it proceeds with increased rapidity as the reaction temperature is increased and for that reason a reaction with an alkali metal hydroxide at a temperature of 60° C. or higher is preferred. Refluxing the reactants will cause the reaction to go to completion within a few hours. The reaction can occur in the presence of a diluent such as water, dioxane, acetone or other liquid organic media in which the alkali is soluble and with which the alkali does not react.

The following example is intended to be illustrative and is not to be construed as a limitation on the invention. The parts are by weight unless otherwise expressly indicated.

*Example*

It is possible to take a mixture of octahalocyclohexene-2-one-1 and octacyclohexene-3-one-1 and react the former preferentially in the presence of a weak alkali to convert it to an aliphatic derivative and thereafter react the octahalocyclohexene-3-one-1 with a strong alkali without previously separating the reaction ingredients. 250 parts of a mixture of octachlorocyclohexene-2-one-1 and octachlorocyclohexene-3-one-1 in which the latter was present in a proportion of about 60% by weight were treated with 400 parts of anhydrous sodium acetate in 600 ml. of dioxane and 1000 ml. of methanol, by refluxing the mixture for about six hours. This reaction mixture was poured onto chopped ice and an oil in an amount of about 212.7 parts separated. On cooling the dried oil, crystals were formed. These crystals were separated by filtration and were found to be unreacted octachlorocyclohexene-3-one-1. The oil filtrate contained approximately 25 to 40% by weight of unreacted octachlorocyclohexene-3-one-1. 23.8 parts of the oil were treated with an excess of 2 N NaOH and the mixture was stirred at room temperature for five days. In the alkaline medium the sodium salt of heptachlorohexadienoic acid settles as a solid. This is removed by cooling and filtration. The filtrate on acidification and extraction yields dichloromaleic acid. Dichloromaleic anhydride was recovered by sublimation of the dichloromaleic acid. In this reaction it is believed that methyl heptachlorohexadiene-2,5-oate is formed by the reaction of sodium acetate and methyl alcohol with octachlorocyclohexene-2-one-1 as demonstrated by conversion of the ester to the free acid. Under the reaction conditions the octachlorocyclohexene-3-one-1 is stable to the alkali metal salts of the weak acid. It is possible to separate octahalocyclohexene-3-one-1 from the methyl ester of heptahalohexadiene-2,5-oic acid and then to react the purified octahalocyclohexene-3-one-1. Another means for purifying octahalocyclohexene-3-one-1 is by the reaction of the mixture with sodium acetate in acetic anhydride. Under these reaction conditions pentahalophenol acetate is formed from the octahalocyclohexene-2-one-1, whereas the octahalocyclohexene-3-one-1 remains substantially unreacted. This mixture can then either be separated or subjected to reaction with a strong alkali to convert the octahalocyclohexene-3-one-1 to dihalomaleic acid or its anhydride.

Octabromocyclohexene - 3 - one - 1, 2,4,6 - trichloro-2,3,5,5,6,6 - pentabromocyclohexene - 3 - one - 1, 2,4,6-trichloro - 2,3,5,5,6,6 - pentabromocyclohexene - 3-one-1 or the octahalocyclohexene-3-one-1 resulting from halogenating phenol with a mixture of chlorine and bromine can be substituted in whole or in part for 2,2,3,4,5,5,6,6-octachlorocyclohexene-3-one-1 recited in the examples. The same type of chemical reaction in which the cyclohexene ring is broken to yield a dihalomaleic acid or its salt in the presence of strong alkali will take place. The temperature at which the above halogenated maleic derivatives are formed can vary from about 0° C. to that of the reflux temperature since the end products are relatively stable and reaction rate is much faster at the elevated temperatures.

The methods described in this invention provide a very simple and easy method for preparing dihalomaleic acids, salts and anhydrides thereof in very good yield of 80% or better.

Although I have explained the invention by reference to specific examples it is believed apparent that many variations can be made in the conditions, the proportions of reacting ingredients and other modifications without departing from the spirit and scope of the invention except as defined in the appended claims.

This application is a division of patent application Serial No. 485,589, filed February 1, 1955, issued on July 15, 1958 as Patent No. 2,843,606.

I claim:

1. A method of reacting octahalocyclohexene-2-one-1 in a mixture containing said compound and octahalocyclohexene-3-one-1 comprising blending said mixture with a dry alkali metal acetate and a member selected from the class consisting of methanol and acetic anhydride, heating the blended ingredients to effect thereby reaction of the octahalocyclohexene-2-one-1 and separating the substantially unreacted octahalocyclohexene-3-one-1 from the reaction mixture, the halogen of said octahalocyclohexenones being selected from the class consisting of chlorine and bromine.

2. The method of claim 1 in which the halogen is chlorine and the salt is the sodium salt of acetic acid.

3. The method of claim 1 in which the halogen is bromine and the salt is the sodium salt of acetic acid.

References Cited in the file of this patent

Biltz: Berichte, vol. 37, pages 4003–4007 (1904).